United States Patent
Yasuda

(10) Patent No.: US 9,587,676 B2
(45) Date of Patent: Mar. 7, 2017

(54) SELF-ALIGNING ROLLER BEARING

(71) Applicant: JTEKT CORPORATION, Osaka-shi, Osaka (JP)

(72) Inventor: Hirotaka Yasuda, Kashihara (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 15/080,762

(22) Filed: Mar. 25, 2016

(65) Prior Publication Data

US 2016/0290393 A1  Oct. 6, 2016

(30) Foreign Application Priority Data

Mar. 31, 2015 (JP) ................................. 2015-071912

(51) Int. Cl.
*F16C 33/46* (2006.01)
*F16C 23/08* (2006.01)

(52) U.S. Cl.
CPC ........ *F16C 33/4605* (2013.01); *F16C 23/086* (2013.01)

(58) Field of Classification Search
CPC ........ F16C 23/084; F16C 19/28; F16C 33/36; F16C 33/48; F16C 33/585
See application file for complete search history.

(56) References Cited

U.S. PATENT DOCUMENTS

| 2,387,962 A | * | 10/1945 | Williams | F16C 23/086 384/568 |
| 2,740,675 A | * | 4/1956 | Arvid | F16C 23/086 384/564 |
| 3,547,504 A | * | 12/1970 | Cedler Lech | F16C 19/38 384/558 |
| 5,586,826 A | * | 12/1996 | Kellstrom | F16C 33/585 384/450 |
| 2015/0252847 A1 | * | 9/2015 | Linden | F16C 23/086 384/551 |

FOREIGN PATENT DOCUMENTS

JP  2012-017770 A  1/2012

* cited by examiner

*Primary Examiner* — Thomas R. Hannon
(74) *Attorney, Agent, or Firm* — Oliff PLC

(57) ABSTRACT

A self-aligning roller bearing includes an outer ring, an inner ring, spherical rollers, a cage having a plurality of pockets that contain the spherical rollers, and a guide ring. Each spherical roller may be rotated on an imaginary line passing through a contact point at which the spherical roller contacts an outer raceway surface and a contact point at which the spherical roller contacts an inner raceway surface. Each pocket has a clearance between the pocket and a corresponding spherical roller, and the size of the pocket is set so that the rotation of the corresponding spherical roller is limited. The guide ring has such a side-surface shape that a small clearance is ensured between the spherical roller and the guide ring even when the spherical roller is rotated, in the pocket, on the imaginary line by a maximum amount at which the rotation of the spherical roller is limited.

4 Claims, 7 Drawing Sheets

SELF-ALIGNING ROLLER BEARING

INCORPORATION BY REFERENCE

The disclosure of Japanese Patent Application No. 2015-071912 filed on Mar. 31, 2015 including the specification, drawings and abstract, is incorporated herein by reference in its entirety.

BACKGROUND OF THE INVENTION

1. Field of the Invention

The present invention relates to a self-aligning roller bearing.

2. Description of Related Art

A known self-aligning roller bearing is described, for example, in Japanese Patent Application Publication No. 2012-17770 (JP 2012-17770 A). As shown in the vertical sectional view of FIG. 9, the self-aligning roller bearing includes an outer ring 81, an inner ring 84, spherical rollers 86, an annular cage 88, and an annular guide ring 90. The outer ring 81 has an outer raceway surface 82 in its inner periphery. The inner ring 84 has two rows of inner raceway surfaces 83 in its outer periphery. The spherical rollers 86 are arranged in two rows between the outer raceway surface 82 and the two rows of inner raceway surfaces 83. The cage 88 holds the spherical rollers 86 arranged in each row. The guide ring 90 is arranged between the cage 88 and the inner ring 84, and between the two rows of spherical rollers 86.

The cage 88 has a ring 91 and a plurality of cage bars 92. The ring 91 is positioned between the two rows of spherical rollers 86. The cage bars 92 extend from both sides of the ring 91 in an axial direction. In each row of spherical rollers 86, a space is formed between adjacent cage bars 92 in a circumferential direction of the cage 88 and serves as a pocket 94 which contains (holds) a corresponding spherical roller 86. The pocket 94 has its pocket surfaces facing the spherical roller 86; the pocket surfaces are constituted of side surfaces 92a of the adjacent cage bars 92 in the circumferential direction and a side surface 91a of the ring 91 in the axial direction.

The ring 91 of the cage 88 is provided with a contact portion 93 in the inner periphery of the ring 91. The contact portion 93 can contact an outer circumferential surface 90a of the guide ring 90. With this structure, the cage 88 is positioned in a radial direction by the guide ring 90. Further, a clearance is provided between the contact portion 93 and the guide ring 90 in the radial direction, and another clearance is provided between the inner ring 84 and the guide ring 90 in the radial direction. Accordingly, the guide ring 90 can independently and freely rotate with respect to the inner ring 84 and the cage 88.

As described in the above, the spherical rollers 86 are each contained in the pocket 94 of the cage 88. Further, predetermined clearances are provided between each spherical roller 86 and the pocket 94 (the pocket surfaces) so that the spherical roller 86 can rotate on its roller center line.

In such a self-aligning roller bearing, the spherical roller 86 may be rotated, by a small angle, on an imaginary line L1 passing through a contact point P1 at which the spherical roller 86 contacts the outer raceway surface 82 and a contact point P2 at which the spherical roller 86 contacts the inner raceway surface 83. In this case, an end surface 86a of the spherical roller 86 may contact a side surface 90b of the guide ring 90. In particular, when the spherical roller 86 on a first side (i.e. left side in FIG. 9) in the axial direction and the spherical roller 86 on a second side (i.e. right side in FIG. 9) in the axial direction are rotated in different directions (as indicated by arrows r1 and r2 in FIG. 9), the guide ring 90 is caught by the spherical rollers 86 on both sides of the guide ring 90 in the axial direction, which may cause abrasion of the guide ring 90 or the like. Further, abrasion powder from the guide ring 90 may be scattered onto the raceway surfaces, adversely affecting the life of the bearing.

SUMMARY OF THE INVENTION

An object of the present invention is to reduce malfunction of the guide ring of the self-aligning roller bearing.

According to an aspect of the present invention, a self-aligning roller bearing includes: an outer ring having an outer raceway surface in an inner periphery of the outer ring, the outer raceway surface being a concave curved surface; an inner ring having two rows of inner raceway surfaces in an outer periphery of the inner ring, the inner raceway surfaces each being a concave curved surface; a plurality of spherical rollers arranged in two rows between the outer raceway surface and the inner raceway surfaces; a cage having a plurality of pockets that contain the spherical rollers arranged in two rows so that the spherical rollers in each row are spaced apart from one another in a circumferential direction; and a guide ring arranged between the cage and the inner ring, and between the two rows of spherical rollers. Each of the spherical rollers is rotated on an imaginary line passing through a contact point at which the spherical roller contacts the outer raceway surface and a contact point at which the spherical roller contacts corresponding one of the inner raceway surfaces. Each of the pockets has a clearance between the pocket and the spherical roller, and the size of the pocket is set so that the rotation of the spherical roller is limited. The guide ring has such a side-surface shape that a small clearance is ensured between each of the spherical rollers and the guide ring even when each of the spherical rollers is rotated, in each of the pockets, on the imaginary line by a maximum amount at which the rotation of the spherical rollers is limited.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
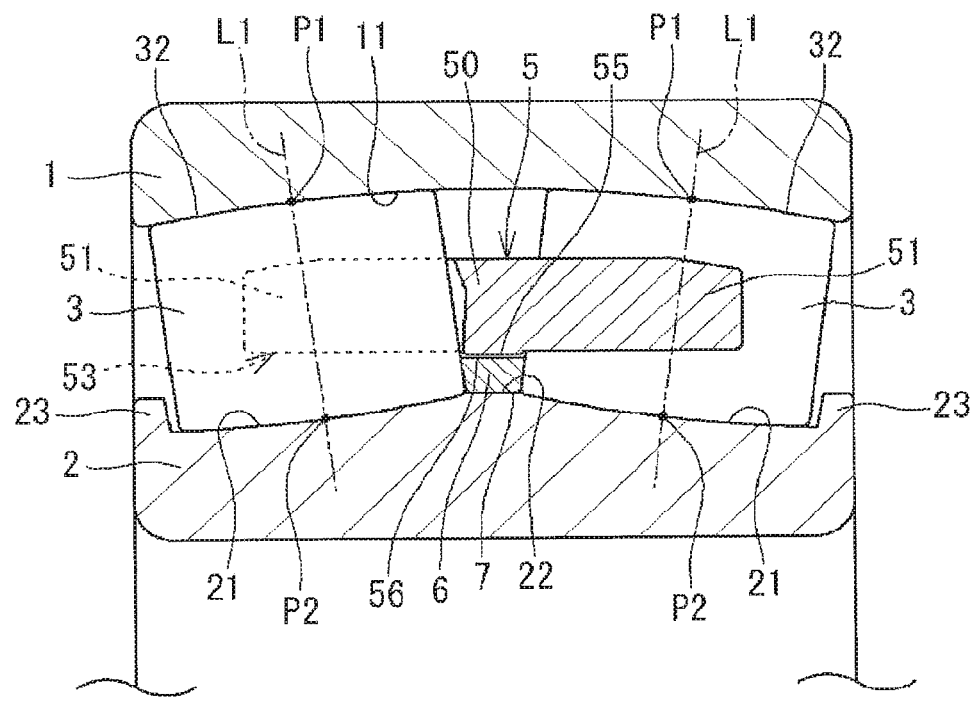
FIG. 1 is a vertical sectional view showing one embodiment of a self-aligning roller bearing of the present invention.

FIG. 1 is a vertical sectional view showing one embodiment of a self-aligning roller bearing of the present invention. This self-aligning roller bearing includes an outer ring 1, an inner ring 2, a plurality of spherical rollers 3, a cage 5, and an annular guide ring 6. The outer ring 1 and the inner ring 2 are arranged concentrically. The spherical rollers 3 are arranged in two rows between the outer ring 1 and the inner ring 2. The cage 5 holds the spherical rollers 3, arranged in two rows, so that the spherical rollers 3 in each row are spaced apart from one another in the circumferential direction. The guide ring 6 is arranged between the cage 5 and the inner ring 2, and between the two rows of spherical rollers 3. In the present embodiment, the axial direction of the bearing is also referred to as "right and left direction".

The outer ring 1 is formed symmetrical in the right and left direction, and is provided with a single outer raceway surface 11 in the inner periphery of the outer ring 1. The outer raceway surface 11 is a concave curved surface, and is formed along a spherical surface (i.e. part of a spherical surface) which has a predetermined radius between the surface and a certain point on the axis (not shown) of the bearing (i.e. center point of the bearing). Thus, the outer raceway surface 11 is shaped in an arc in section (i.e. vertical section) that includes the axis (center line) of the bearing, as shown in FIG. 1.

The inner ring 2 is also formed symmetrical in the right and left direction, and is provided with two rows of inner raceway surfaces 21 in the outer periphery of the inner ring 2. As shown in FIG. 1, the inner raceway surfaces 21 are concave curved surfaces, and are each shaped in an arc in the vertical section of the bearing. This arc has a radius equal to the radius of the above-described spherical surface (i.e. part of the spherical surface) that forms the outer raceway surface 11 of the outer ring 1. The inner ring 2 is provided with a cylindrical surface 22 in the outer periphery of the inner ring 2, between the two rows of inner raceway surfaces 21. The cylindrical surface 22 is parallel to the axis of the bearing. The inner ring 2 is further provided with ribs 23 on the outer sides of the inner raceway surfaces 21 in the axial direction, in order to prevent the spherical rollers 3 from falling from the cage 5.

Each of the spherical rollers 3 is formed in a barrel, with an outer circumferential surface 32 that is a convex curved surface, and rolls on the outer raceway surface 11 and the inner raceway surface 21. The spherical rollers 3 are arranged in two rows between the outer raceway surface 11 of the outer ring 1 and the two rows of inner raceway surfaces 21 of the inner ring 2. In each of the two rows, the spherical rollers 3 are arranged in the circumferential direction.

Figure 2:
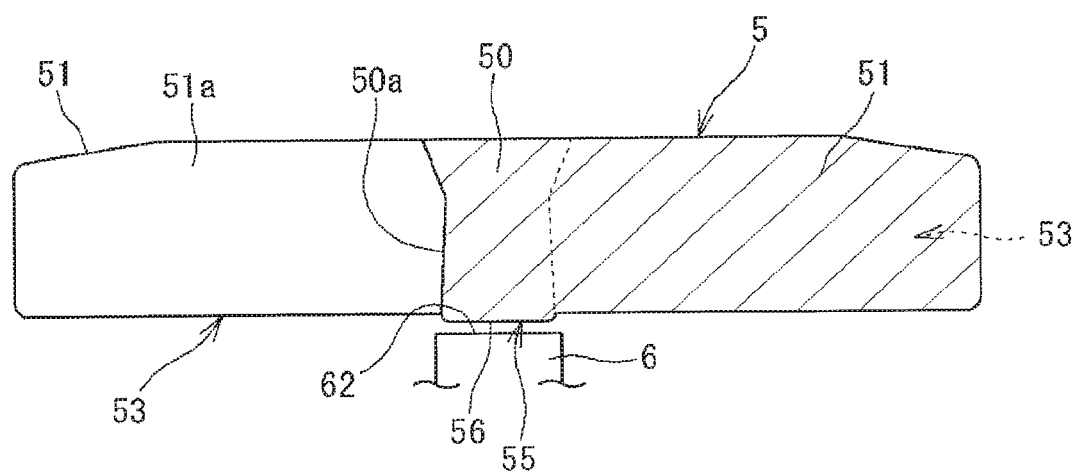
FIG. 2 is a sectional view of a cage.
Figure 3:
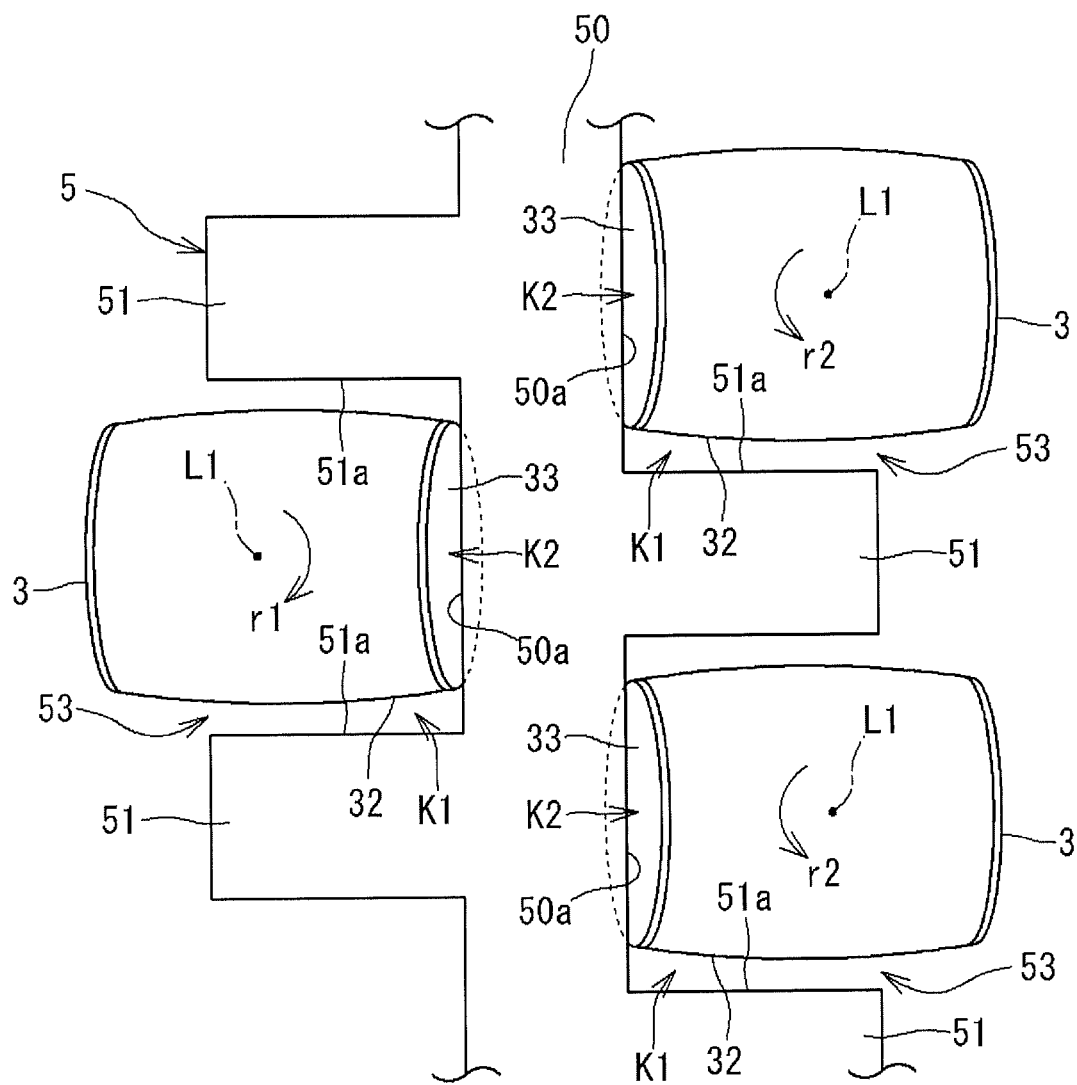
FIG. 3 is a view showing part of the cage and spherical rollers, as viewed from the outside of the bearing in a radial direction.

FIG. 2 is a sectional view of the cage 5. FIG. 3 is a view showing part of the cage 5 and the spherical rollers 3, as viewed from the outside of the bearing in the radial direction. The cage 5 is generally annular, and has a central ring 50 and cage bars 51. The cage bars 51 extend from both sides of the ring 50 in the axial direction. The ring 50, first cage bars 51 on a first side (i.e. left side in FIG. 3) in the axial direction, and second cage bars 51 on a second side (i.e. right side in FIG. 3) in the axial direction are formed integrally.

The ring 50 is an annular portion, and is positioned between the two rows of spherical rollers 3. The first cage bars 51 are evenly spaced apart in the circumferential direction. The second cage bars 51 are also evenly spaced apart in the circumferential direction. Further, a pocket 53 is formed between adjacent first cage bars 51 in the circumferential direction. The pocket 53 is also formed between adjacent second cage bars 51 in the circumferential direction. The spherical rollers 3 in the row on the first side in the axial direction and the spherical rollers 3 in the row on the second side in the axial direction have an identical shape. Also, pockets 53 on the first side in the axial direction and pockets 53 on the second side in the axial direction have an identical shape. A single pocket 53 contains a single spherical roller 3.

Thus, the spherical rollers 3 in each row are held by the cage 5, at predetermined intervals (in this embodiment, at regular intervals) in the circumferential direction. The cage 5 has the pockets 53 that contain the spherical rollers 3 arranged in two rows. The pockets 53 are used to hold the spherical rollers 3 in each row, while spacing the spherical rollers 3 apart in the circumferential direction. Each pocket 53 has its pocket surfaces constituted of side surfaces 51a of adjacent cage bars 51 in the circumferential direction (hereinafter referred to as "circumferential side surfaces 51a") and a side surface 50a of the ring 50 in the axial direction (hereinafter referred to as "axial side surface 50a"). The pocket surfaces face the spherical roller 3 via clearances (K1, K2), and can be brought into contact with the spherical roller 3.

In FIG. 1, the guide ring 6 is an annular component, and is provided between the ring 50 of the cage 5 and the inner ring 2, and between the two rows of spherical rollers 3. To be more specific, the guide ring 6 is provided on the outer side of the cylindrical surface 22 of the inner ring 2 in the radial direction, and on the inner side of the ring 50 of the cage 5 in the radial direction. Here, a clearance is provided between the guide ring 6 and the cylindrical surface 22. Further, a clearance is also provided between the guide ring 6 and an inner circumferential surface 56 of the ring 50. Thus, the guide ring 6 is positioned by the cylindrical surface 22 while having a small movement space in the radial direction. The cage 5 is positioned by the guide ring 6 while having a small movement space in the radial direction.

The shape of the cage 5 will be further described below. In FIG. 2, the ring 50 is provided with a contact portion 55 in the inner periphery of the ring 50. The contact portion 55 can contact an outer circumferential surface 62 of the guide ring 6 so that the cage 5 is positioned in the radial direction. With the cage 5, the inner ring 2, and the guide ring 6 arranged concentrically, the inner circumferential surface 56 of the contact portion 55 and the outer circumferential surface 62 of the guide ring 6 constitute a cylindrical surface whose axis corresponds to the axis of the inner ring 2. Further, the clearance is provided between the inner circumferential surface 56 of the contact portion 55 and the outer circumferential surface 62 of the guide ring 6, in the radial direction. In FIG. 1, the clearance is provided between the cylindrical surface 22 of the inner ring 2 and the inner circumferential surface 7 of the guide ring 6, in the radial direction. Accordingly, the guide ring 6 can independently and freely rotate with respect to the inner ring 2 and the cage 5.

In this embodiment, the outer ring 1, the inner ring 2, and the spherical rollers 3 are made of bearing steel etc. The guide ring 6 is made of cast iron, but may be made of other metal. The cage 5 is made of brass, but may be made of other metal.

Figure 8A:
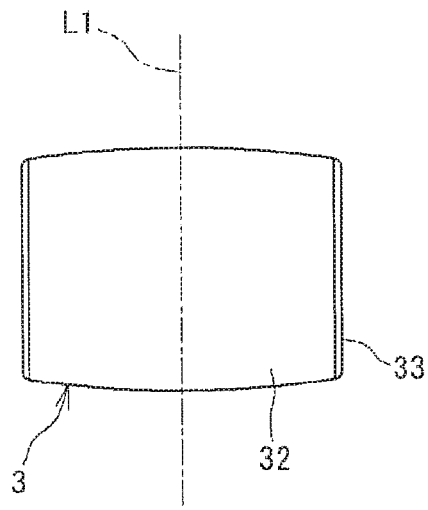
FIG. 8A is a diagram showing the spherical roller that has not yet been rotated.
Figure 8B:
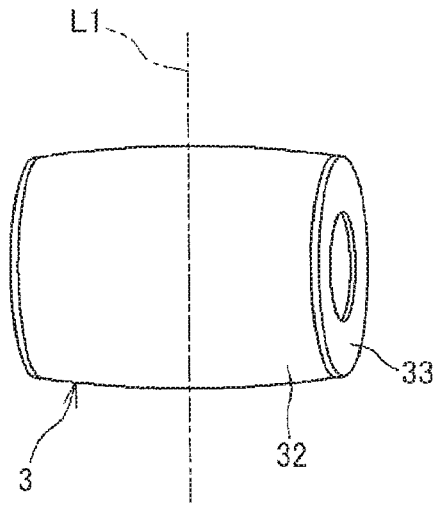
FIG. 8B is a diagram showing the spherical roller that has been rotated on an imaginary line by a small angle.
Figure 9:
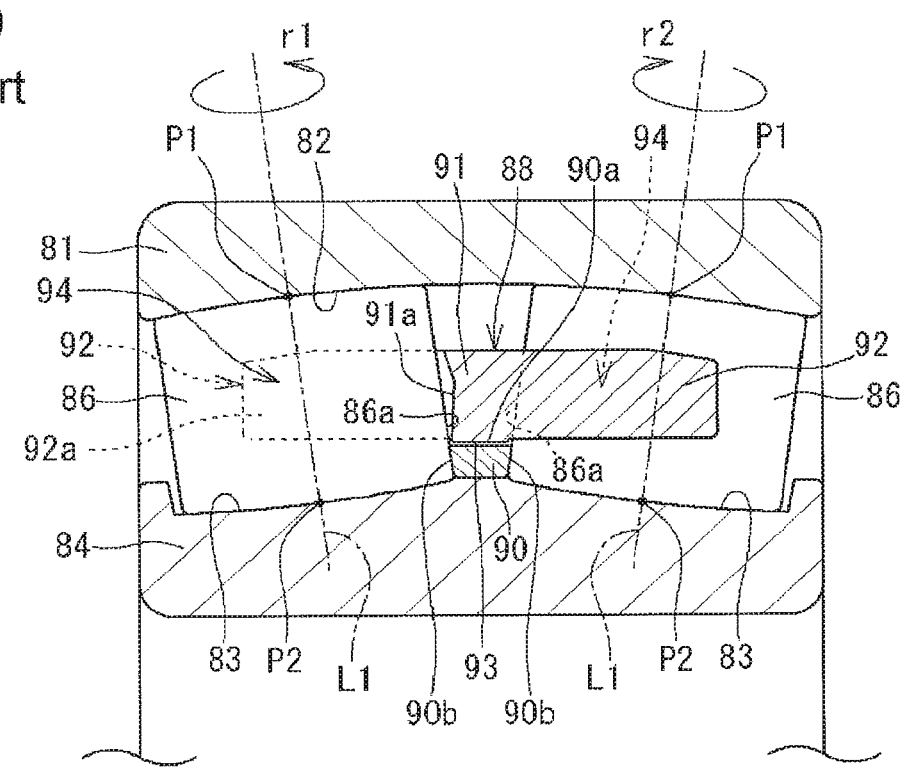
FIG. 9 is a vertical sectional view showing a conventional self-aligning roller bearing.

In the above-structured self-aligning roller bearing (see FIG. 1), during the rotation of the bearing (in this embodiment, the inner ring 2 rotates), each of the spherical rollers 3 on the first side and on the second side in the axial direction may be rotated (tilted), by a small angle, on an imaginary line L1 passing through a contact point P1 at which the spherical roller 3 contacts the outer raceway surface 11 and a contact point P2 at which the spherical roller 3 contacts the inner raceway surface 21. FIG. 8A shows a spherical roller 3 that has not yet been rotated, and FIG. 8B shows the spherical roller 3 that has been rotated on the imaginary line L1 by a small angle. When the spherical roller 3 is rotated on the imaginary line L1 (in the state in FIG. 8B), the shape of the spherical roller 3 in a vertical sectional view is changed. Specifically, when the spherical roller 3 has not yet been rotated, an end surface 33 of the spherical roller 3 is straight in the vertical sectional view. When the spherical roller 3 is rotated, however, the end surface 33 of the spherical roller 3 becomes convex in the vertical sectional view. Here, the contact points P1 and P2 are center points of the outer circumferential surface 32 of the spherical roller 3, as shown in FIG. 1.

As described in the above, each of the spherical rollers 3 may be rotated on the imaginary line L1. However, since each of the spherical rollers 3 is contained in the pocket 53 of the cage 5 as shown in FIG. 3, the amount of the rotation is limited to a predetermined small angle. Specifically, in this embodiment, even when the spherical roller 3 on the first side (i.e. left side in FIG. 3) in the axial direction starts rotating clockwise (i.e. in the direction shown by an arrow r1 in FIG. 3) on the imaginary line L1, the outer circumferential surface 32 of the spherical roller 3 contacts a circumferential side surface 51a of the cage bar 51 so that the rotation of the spherical roller 3 is limited. The amount of rotation of the spherical roller 3 depends on a clearance K1 between the outer circumferential surface 32 of the spherical roller 3 and the circumferential side surface 51a of the cage bar 51. Alternatively, when the spherical roller 3 starts rotating clockwise (i.e. in the direction shown by the arrow r1 in FIG. 3) on the imaginary line L1, the end surface 33 of the spherical roller 3 may contact an axial side surface 50a of the ring 50 (before the spherical roller 3 contacts the cage bar 51, as described in the above) so that the rotation of the spherical roller 3 is limited. In this case, the amount of rotation of the spherical roller 3 depends on a clearance K2 between the end surface 33 of the spherical roller 3 and the axial side surface 50a of the ring 50.

The same holds true to the second side (i.e. right side in FIG. 3) in the axial direction. Specifically, in this embodiment, even when the spherical roller 3 starts rotating counterclockwise (i.e. in the direction shown by an arrow r2 in FIG. 3) on the imaginary line L1, the outer circumferential surface 32 of the spherical roller 3 contacts a circumferential side surface 51a of the cage bar 51 so that the rotation of the spherical roller 3 is limited. The amount of rotation of the spherical roller 3 depends on the clearance K1 between the outer circumferential surface 32 of the spherical roller 3 and the circumferential side surface 51a of the cage bar 51. Alternatively, when the spherical roller 3 starts rotating counterclockwise (i.e. in the direction shown by the arrow r2 in FIG. 3) on the imaginary line L1, the end surface 33 of the spherical roller 3 may contact an axial side surface 50a of the ring 50 (before the spherical roller 3 contacts the cage bar 51, as described in the above) so that the rotation of the spherical roller 3 is limited. In this case, the amount of rotation of the spherical roller 3 depends on the clearance K2 between the end surface 33 of the spherical roller 3 and the axial side surface 50a of the ring 50.

The clearance K1 (K2) is of a predetermined size so that each of the spherical rollers 3 is not excessively rotated on the imaginary line L1. That is, each pocket 53 has a predetermined size of clearance K1 (K2) provided between the pocket 53 and the spherical roller 3, and thus allows the rotation of the spherical roller 3 on the imaginary line L1. At the same time, the size of each pocket 53, or the clearance K1 (K2), is set such that the rotation of the spherical roller 3 on the imaginary line L1 is limited.

Figure 4:
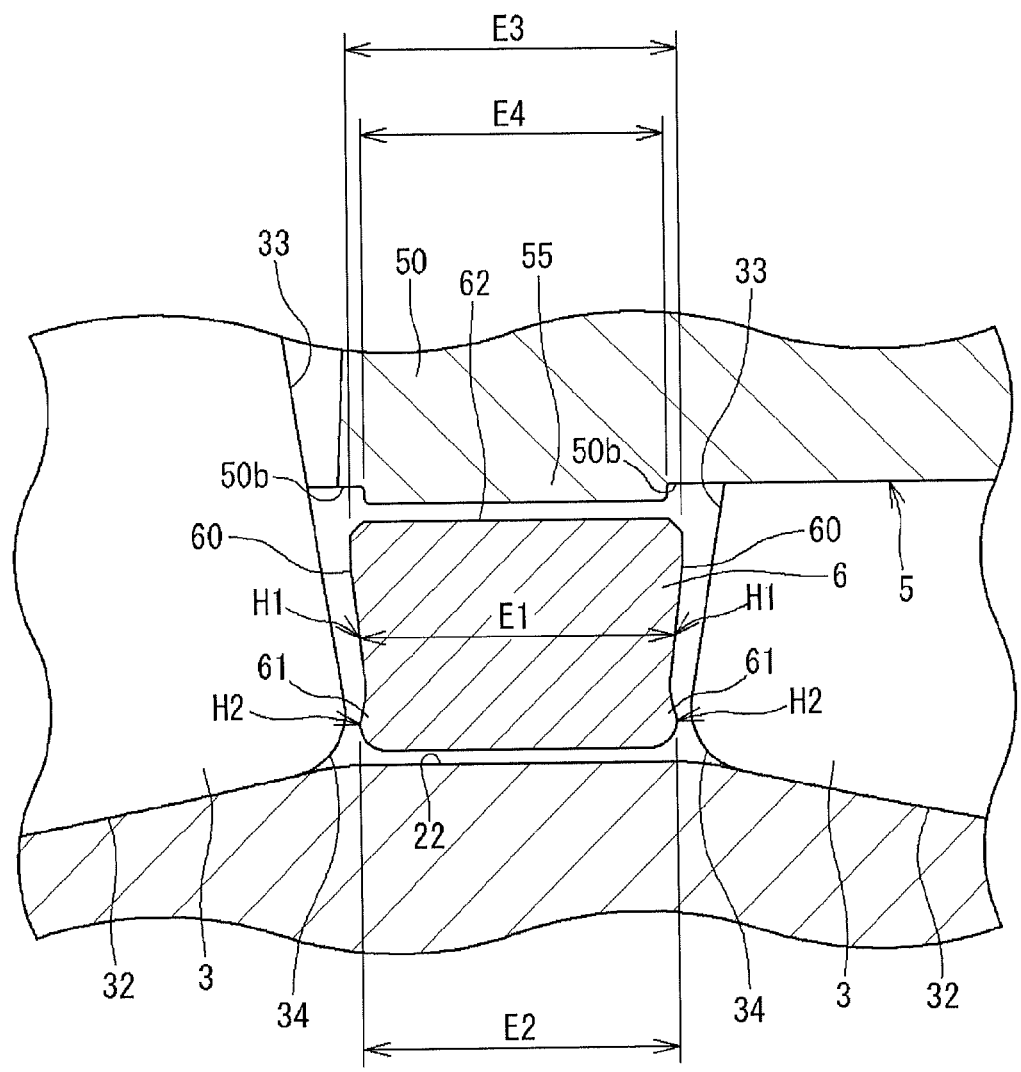
FIG. 4 is a sectional view showing a guide ring and its surroundings in a state where the spherical rollers have not yet been rotated.
Figure 5:
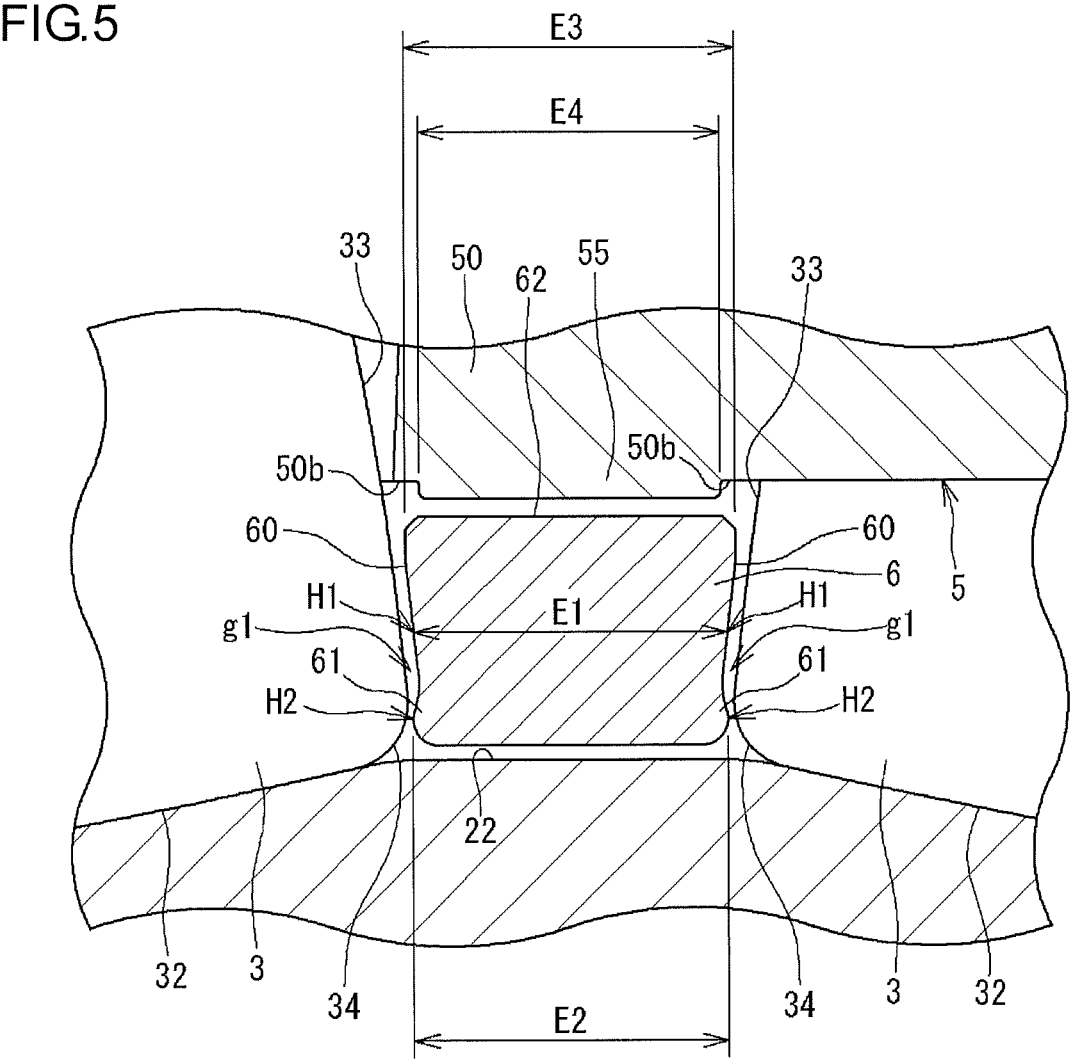
FIG. 5 is a sectional view showing the guide ring and its surroundings in a state where the spherical rollers have been rotated by a small angle.

As shown in FIGS. 4 and 5, when the spherical roller 3 is rotated on the imaginary line L1 by a small angle, part of the end surface 33 of the spherical roller 3 approaches a side surface 60 of the guide ring 6. FIG. 4 is a sectional view showing the guide ring 6 and its surroundings in a state where the spherical roller 3 has not yet been rotated (in this state, the center line of the spherical roller 3 lies on the vertical section). FIG. 5 is a sectional view showing the guide ring 6 and its surroundings in a state where the spherical roller 3 has been rotated by a small angle. The small angle by which the spherical roller 3 has been rotated corresponds to a maximum rotation angle at which the rotation of the spherical roller 3 is limited by the contact between the spherical roller 3 and the pocket surface 51a of the pocket 53 in the cage 5 (see FIG. 3). That is, the small angle corresponds to a permissible maximum rotation angle. As shown in FIG. 5, even when the spherical roller 3 is rotated by the maximum amount of rotation, the end surface 33 of the spherical roller 3 does not contact the side surface 60 of the guide ring 6.

In the present embodiment, the shape of the side surface 60 of the guide ring 6 (hereinafter referred to also as "side-surface shape") is concave so that the end surface 33 of the spherical roller 3 does not contact the side surface 60 of the guide ring 6. This will be specifically described below. When the spherical roller 3 is rotated on the imaginary line L1, as described with reference to FIG. 8B, the end surface 33 of the spherical roller 3 becomes convex in the vertical section. The guide ring 6 (see FIG. 5) has a concave side surface so as not to contact the end surface 33 of the spherical roller 3. With this concave shape, an axial length E1 of a radial intermediate portion H1 of the guide ring 6 is decreased, and an axial length E2 of a radial inner portion H2 of the guide ring 6 is increased (E1<E2).

As described in the above (as shown in FIG. 5), the guide ring 6 has such a side-surface shape that a small clearance g1 can be ensured between the end surface 33 of the spherical roller 3 and the side surface 60 of the guide ring 6 even when the spherical roller 3 is rotated, in the pocket 53, on the imaginary line L1 by the maximum amount at which the rotation of the spherical roller 3 is limited.

The guide ring 6 has the concave side surface not only on the first side but also on the second side in the axial direction. That is, even when the spherical rollers 3 on both sides in the axial direction are rotated, in the pockets 53, on the imaginary line L1 by the maximum amount at which the rotation of the spherical rollers 3 is limited, the side-surface shape of the guide ring 6 can ensure a small clearance g1 between the end surface 33 of the spherical roller 3 and the side surface 60 of the guide ring 6 on both sides in the axial direction.

The self-aligning roller bearing that includes the guide ring 6 of the present embodiment can prevent the spherical roller 3 from contacting the guide ring 6 even when the spherical roller 3 is rotated on the imaginary line L1 passing through the contact point P1 at which the spherical roller 3 contacts the outer raceway surface 11 and the contact point P2 at which the spherical roller 3 contacts the inner raceway surface 21 (see FIG. 5). This can prevent abrasion of the guide ring 6 or the like. Thus, it is possible to prevent the abrasion powder from the guide ring 6 from adhering to the outer and inner raceway surfaces 11, 21 and adversely affecting the life of the bearing.

In particular, even when the spherical rollers 3 on both sides in the axial direction are rotated in different directions (as indicated by the arrows r1 and r2 in FIG. 3), the clearances g1 are ensured between the spherical roller 3 on the first side and the guide ring 6 and between the spherical roller 3 on the second side and the guide ring 6. If such clearances g1 are not ensured, the guide ring 6 is caught by the spherical rollers 3 on both sides in the axial direction. This interferes with rotation of the guide ring 6, and may cause abrasion of the guide ring 6. According to the present embodiment, however, it is possible to prevent the spherical rollers 3 from interfering with rotation of the guide ring 6, which suppresses abrasion of the guide ring 6.

In the guide ring 6 of the present embodiment (see FIGS. 4 and 5), the axial length E1 of the radial intermediate portion H1 is decreased. In contrast, the axial length E2 of the radial inner portion H2 is increased to increase a contact area between the guide ring 6 and the cylindrical surface 22 of the inner ring 2. This can prevent rising of the contact pressure between the guide ring 6 and the cylindrical surface 22 of the inner ring 2, and thus allows the guide ring 6 to be stably supported by the inner ring 2 in the radial direction.

As described above, although the axial length E2 of the radial inner portion H2 of the guide ring 6 is increased, the increased portion 61 does not contact the end surface 33 of the spherical roller 3 rotated on the imaginary line L1. This is because the increased portion 61 faces a chamfer 34, as shown in FIG. 5, which is formed in a boundary portion between the end surface 33 and the outer circumferential surface 32 of the spherical roller 3.

In the present embodiment, the ring 50 of the cage 5 has the contact portion 55 in the inner periphery of the ring 50, which can contact the outer circumferential surface 62 of the guide ring 6, as described in the above (see FIG. 2). The contact portion 55, formed in the inner periphery of the ring 50 (see FIG. 5), protrudes inward in the radial direction from inner circumferential surfaces 50b of the ring 50 which are formed on both sides of the ring 50 in the axial direction. An axial length E3 of the outer circumferential surface 62 of the guide ring 6 is greater than an axial length E4 of the contact portion 55 (E3>E4). This can prevent rising of the contact pressure between the outer circumferential surface 62 of the guide ring 6 and the contact portion 55, and thus allows the ring 50 (cage 5) to be stably supported by the guide ring 6. As described in the above, the axial length E1 of the radial intermediate portion H1 of the guide ring 6 is decreased so that the guide ring 6 and the spherical roller 3 are not brought into contact with each other. In contrast, the axial length E3 of the outer circumferential surface 62 of the guide ring 6 is increased so that the ring 50 (cage 5) is stably supported.

Figure 6:
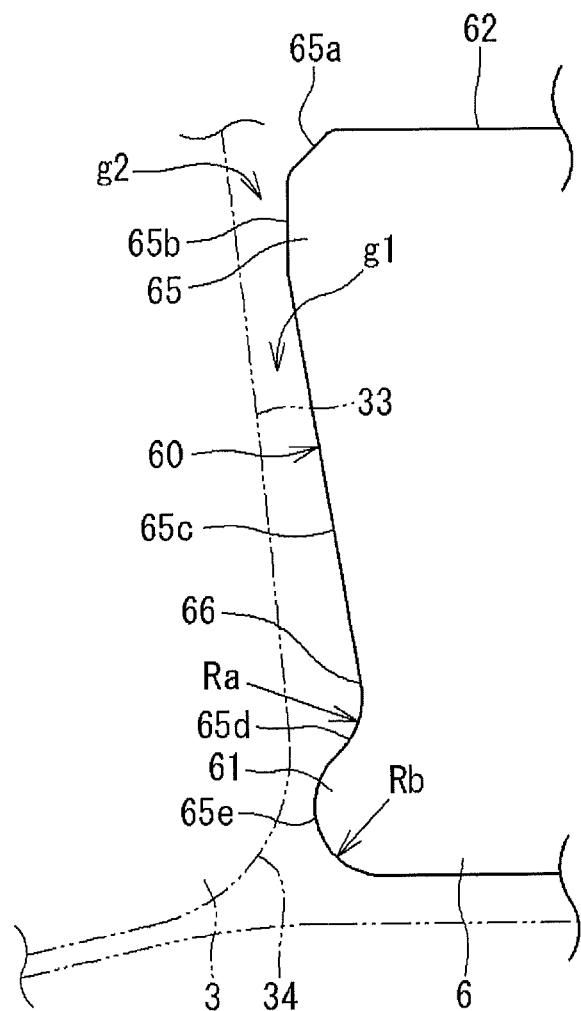
FIG. 6 is an enlarged view showing a side surface of the guide ring.

FIG. 6 is an enlarged view showing the side surface 60 of the guide ring 6. The shape of the side surface 60 will be more specifically described below. In FIG. 6, the spherical roller 3 is shown by a long dashed double-short dashed line. The spherical roller 3 has been rotated on the imaginary line L1 (see FIG. 3). The guide ring 6 has the increased portion (first increased portion) 61 on the inner side in the radial direction and a second increased portion 65 on the outer side in the radial direction. The side surface 60 also has a decreased portion 66 between the increased portions 61 and 65, and is concave as a whole. In this guide ring 6, the axial lengths of the increased portions 61, 65 are greater than the axial length of the decreased portion 66.

The side surface 60 of the guide ring 6 has a chamfer 65a formed at an edge on the outer side in the radial direction. The side surface 60 further has a flat surface 65b on the inner side of the chamfer 65a in the radial direction. The flat surface 65b is formed parallel to a plane which is orthogonal to the axis of the guide ring 6 (i.e. axis of the bearing). In the self-aligning roller bearing, the end surface 33 of the spherical roller 3 is tilted to the plane that is orthogonal to the axis of the bearing. Therefore, a clearance g2 which is provided between the flat surface 65b and the end surface 33 of the spherical roller 3 is enlarged toward the outer side in the radial direction. This facilitates a lubricating oil to flow from the outside of the guide ring 6 in the radial direction, through the clearance g2, and into a space between the side surface 60 of the guide ring 6 and the end surface 33 of the spherical roller 3, so that oil films are easily formed.

Further, a tapered surface 65c is provided on the inner side of the flat surface 65b in the radial direction. The tapered surface 65c is tilted with respect to the plane that is orthogonal to the axis of the guide ring 6 (i.e. axis of the bearing), and is straight in a vertical section as shown in FIG. 6. This allows the concave shape of the side surface 60 to be as simple as possible. Further, a rounded concave surface 65d is provided on the inner side of the tapered surface 65c in the radial direction. This rounded concave surface 65d is concave in the vertical section, and has a constant radius of curvature Ra. The rounded concave surface 65d is continuous, in a smooth manner, to the tapered surface 65c and a rounded convex surface 65e provided on the inner side of the rounded concave surface 65d in the radial direction. The rounded convex surface 65e is convex in the vertical section, and has a constant radius of curvature Rb. This rounded convex surface 65e forms a side surface of the increased portion 61. Thus, the side surface 60 of the guide ring 6 has a concave shape formed of as simple a shape as possible.

Figure 7:
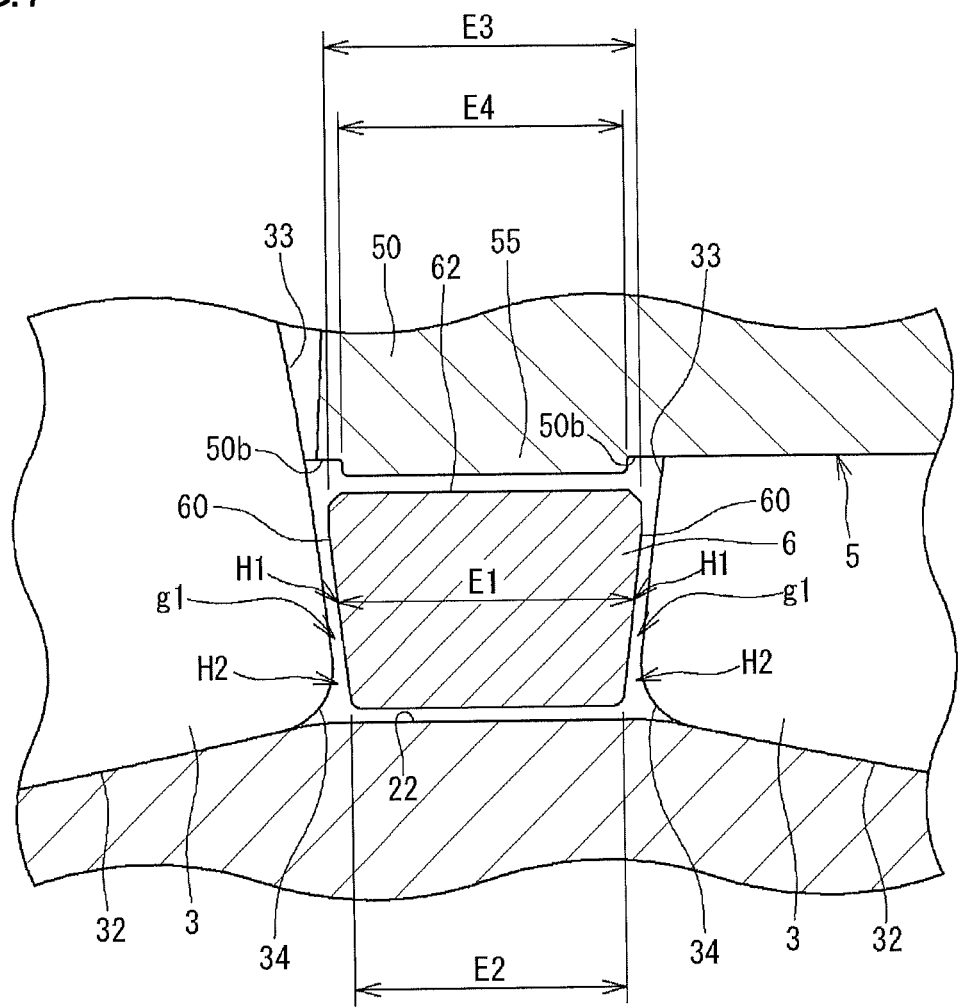
FIG. 7 is a sectional view showing a modification of the guide ring.

FIG. 7 is a sectional view showing a modification of the guide ring 6. FIG. 7 shows the spherical roller 3 that has been rotated on the imaginary line L1 (see FIG. 3). The guide ring 6 shown in FIG. 7 is not provided with the increased portion 61 on the inner side in the radial direction in comparison with the guide ring 6 shown in FIG. 5, and the other structures are the same as those of the above embodiment. In this modification shown in FIG. 7, each of the pockets 53 (see FIG. 3) of the cage 5 has the clearances K1, K2 between the spherical roller 3 and the pocket 53 and permits rotation of the spherical roller 3 on the imaginary line L1 as in the above embodiment. In the same manner as the above embodiment, the size of each pocket 53, or the clearances K1 and K2, is set such that the rotation of the spherical roller 3 on the imaginary line L1 is limited to a small angle. The guide ring 6 has such a side-surface shape that a small clearance g1 can be ensured between the end surface 33 of the spherical roller 3 and the side surface 60 of the guide ring 6 even when the spherical roller 3 is rotated, in the pocket 53, on the imaginary line L1 by the maximum amount at which the rotation of the spherical roller 3 is limited.

Even in the self-aligning roller bearing with the guide ring 6 shown in FIG. 7, it is possible to prevent the spherical roller 3 from contacting the guide ring 6 even when the spherical roller 3 is rotated on the imaginary line L1. This can suppress abrasion of the guide ring 6 or the like. This can prevent the abrasion powder from the guide ring 6 from adhering to the outer and inner raceway surfaces 11, 21 and adversely affecting the life of the bearing.

The self-aligning roller bearing according to the present invention is not limited to the forms shown in the figures, and may be implemented in other embodiments within the scope of the present invention. For example, the cage 5 may have a shape other than that shown in the figures. The size of clearance K1 (K2) between the pocket 53 of the cage 5 and the spherical roller 3 may be set at any value, and depending on the value, the concave shape of the side surface 60 of the guide ring 6 is determined.

What is claimed is:

1. A self-aligning roller bearing comprising:
   an outer ring having an outer raceway surface in an inner periphery of the outer ring, the outer raceway surface being a concave curved surface;
   an inner ring having two rows of inner raceway surfaces in an outer periphery of the inner ring, the inner raceway surfaces each being a concave curved surface;
   a plurality of spherical rollers arranged in two rows between the outer raceway surface and the inner raceway surfaces;
   a cage having a plurality of pockets that contain the spherical rollers arranged in two rows so that the spherical rollers in each row are spaced apart from one another in a circumferential direction; and
   a guide ring arranged between the cage and the inner ring, and between the two rows of spherical rollers, wherein
   each of the spherical rollers is rotated on an imaginary line passing through a contact point at which the spherical roller contacts the outer raceway surface and a contact point at which the spherical roller contacts corresponding one of the inner raceway surfaces;
   each of the pockets has a clearance between the pocket and the spherical roller, and the size of the pocket is set so that the rotation of the spherical roller is limited; and
   the guide ring has such a side-surface shape that a clearance is ensured between each of the spherical rollers and the guide ring even when each of the spherical rollers is rotated, in each of the pockets, on the imaginary line by a maximum amount at which the rotation of the spherical rollers is limited.

2. The self-aligning roller bearing according to claim 1, wherein the guide ring has, as the side-surface shape, such a concave shape that an axial length of a radial intermediate portion of the guide ring is decreased with respect to an axial length of a radial outer portion of the guide ring and an axial length of a radial inner portion of the guide ring is increased with respect to the axial length of the radial intermediate portion of the guide ring.

3. The self-aligning roller bearing according to claim 2, wherein
   the cage has a ring positioned between the two rows of spherical rollers and a plurality of cage bars extending from both sides of the ring in an axial direction,
   the ring has a contact portion in an inner periphery of the ring, the contact portion configured to contact an outer circumferential surface of the guide ring, and
   an axial length of the outer circumferential surface of the guide ring is greater than an axial length of the contact portion.

4. The self-aligning roller bearing according to claim 1, wherein
   the cage has a ring positioned between the two rows of spherical rollers and a plurality of cage bars extending from both sides of the ring in an axial direction,
   the ring has a contact portion in an inner periphery of the ring, the contact portion configured to contact an outer circumferential surface of the guide ring, and
   an axial length of the outer circumferential surface of the guide ring is greater than an axial length of the contact portion.

* * * * *